United States Patent
Sakanoue

(10) Patent No.: US 6,677,747 B2
(45) Date of Patent: Jan. 13, 2004

(54) ROTATION SENSOR AND MANUFACTURING MOLD THEREFOR

(75) Inventor: Hiroshi Sakanoue, Toyko (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 24 days.

(21) Appl. No.: 10/122,221

(22) Filed: Apr. 16, 2002

(65) Prior Publication Data

US 2003/0085698 A1 May 8, 2003

(30) Foreign Application Priority Data

Nov. 5, 2001 (JP) .................................. P.2001-339334

(51) Int. Cl.[7] ............................ G01B 7/14; G01P 3/488; G01D 5/245
(52) U.S. Cl. .............................. 324/207.25; 324/207.2; 174/52.2
(58) Field of Search ................... 324/207.2, 207.21, 324/207.23, 207.24, 207.25; 29/602.1, 841; 264/272.11, 272.15, 272.16; 174/52.2

(56) References Cited

U.S. PATENT DOCUMENTS 6,291,990 B1 * 9/2001 Nakane et al. ......... 324/207.25

FOREIGN PATENT DOCUMENTS

| JP | 10-132836 | 5/1998 |
| JP | 10-239337 | 9/1998 |

* cited by examiner

Primary Examiner—Walter E. Snow
(74) Attorney, Agent, or Firm—Sughrue Mion, PLLC

(57) ABSTRACT

A rotation sensor includes a Hall element 3 for sensing a magnetic substance that is approaching, a permanent magnet that is provided adjacent the Hall element for applying a magnetic field to the Hall element, and a main body portion made of a resin and mounting the Hall element, the permanent magnet and the electronic parts electrically connected to the Hall element, wherein the resin is swollen in a taper manner in a boundary region between the permanent magnet and the main body portion, and the resin is swollen at a corner portion of the permanent magnet.

2 Claims, 6 Drawing Sheets

ROTATION SENSOR AND MANUFACTURING MOLD THEREFOR

BACKGROUND OF THE INVENTION

1. Field of the Invention

The present invention relates to a rotation sensor for sensing the speed of rotation of a gear type magnetic rotor, for instance, and a mold for manufacturing the rotation sensor.

2. Description of the Related Art

FIG. 7 is a side view showing the conventional rotation sensor. FIG. 8 is a cross-sectional view of the rotation sensor taken along the line B—B in FIG. 7, and FIG. 9 is a front view of a sensor main body as shown in FIG. 8. As shown in these figures, the rotation sensor comprises the sensor main body 1 made of an insulating resin with the electronic parts mounted, and a case 2 made of insulating resin for tightly covering the sensor main body 1. Further, the sensor main body 1 comprises a main body portion 1a, a board portion 1b, an intermediate portion 1c, and a connector portion 1d. The main body portion 1a has mounted a Hall element 3 for detecting the rotation of a magnetic rotor, a permanent magnet 4 for applying a magnetic field to the Hall element 3, and a circuit substrate 7 having mounted the electronic parts 5 for processing an output signal of the Hall element 3 and formed with a circuit pattern 6.

The main body portion la is shaped like a substantially slender plate and has one end connected perpendicularly to a principal plane of the board portion 1b. And the circuit board 7 is mounted on the principal plane on one side. The permanent magnet 4 is mounted on the other end portion of the main body portion 1a perpendicularly to the main body portion 1a, and the Hall element 3 that is a sensor element for detecting the approaching magnetic substance is disposed on the principal plane outside the permanent magnet 4.

Also, the connector portion 1d is extended from the other end face of the intermediate portion 1c. The connector portion 1d extends from the other end face of the intermediate portion 1c perpendicularly to the main body portion 1a. A terminal 8 that is electrically connected to the circuit pattern 6 of the main body portion 1a is buried in the connector portion 1d. At a top end portion of L-character shape, a concave engagement portion connected to an external apparatus is formed, and the terminal 8 protrudes into the engagement portion.

The case 2 is composed of a cylindrical sheath portion 2a with a bottom, a flange portion 2b with an opening end portion of the sheath portion 2a thickened radially, a support portion 2c with a part of the flange portion 2b protruding radially outwardly, and a holding portion 2d protruding on the principal plane of the flange portion 2b in parallel to the sheath portion 2a.

The rotation sensor with the above constitution is attached at a predetermined position of the vehicle. With the rotation of the rotor like a gear, for example, that is the magnetic substance provided against the Hall element 3 of the rotation sensor, a concave portion and a convex portion of the rotor alternately come closer to the Hall element 3. If a magnetic field from the permanent magnet 4 to be applied to the Hall element 3 varies, the Hall element 3 detects a variation in the magnetic field as a voltage change. The voltage change produced in the Hall element 3 is converted into a pulse wave by the electronic parts 5, and then this electrical signal is sent via the terminal 8 of the connect or portion 1d to the external apparatus, not shown, so that the speed of rotation of the rotor is detected.

In a manufacturing method for the rotation sensor, first of all, the sensor main body 1 is produced by molding integrally the main body portion 1a, the board portion 1b, the intermediate portion 1c, and the connector portion 1d with the terminal 8 and the permanent magnet 4 buried. FIGS. 10A and 10B are views for explaining the molding of the conventional rotation sensor. FIG. 10A is across-sectional view, and FIG. 10B is a perspective view. FIG. 11 is a side view showing the permanent magnet after molding and its surroundings, and FIG. 12 is a lower view of the permanent magnet as seen from a direction of the arrow in FIG. 11.

In the figures, a molding apparatus 10 is composed of a first metal mold 11 and a second metal mold 12, in which the first metal mold 11 has a magnet stage portion 11a for laying the permanent magnet 4 in molding, and each of the first metal mold 11 and the second metal mold 12 has a main body portion molding space 12a that becomes the main body portion 1a of the rotation sensor after molding. The permanent magnet 4 is inserted into and laid on the magnet stage portion 11a of the first metal mold 11, and then the second metal mold 12 is engaged with the first metal mold 11 to fill a resin into the main body portion molding space 12a, whereby the permanent magnet 4 and the main body portion 11a of the rotation sensor are molded integrally as shown in FIG. 11.

Thereafter, the Hall element 3 and the circuit board 7 are mounted on the main body portion 1a to produce the sensor main body 1. On the other hand, the case 2 is also produced as a piece by molding. And the case 2 is covered over the sensor main body 1, an upper edge part 2g of the holding portion 2d for the case 2 is caulked thermally, so that the sensor main body 1 and case 2 are fully integrated.

However, the conventional rotation sensor suffers from such a problem that the edge part of the permanent magnet 4 is likely to chip or break off, when the permanent magnet 4 is laid on the magnet stage portion 11a of the first metal mold 11. That is, since an opening portion 11b of the magnet stage portion 11a in the first metal mold 11 has a right angled edge, as shown in FIGS. 10A and 10B, the edge part of the permanent magnet 4 makes contact with the opening portion 11b to chip or break off, when the permanent magnet 4 is inserted into the magnet stage portion 11a.

Also, when the permanent magnet 4 is laid on the magnet stage portion 11a, the permanent magnet 4 makes contact with a bottom portion 11c of the magnet stage portion 11a to chip or break off at the edge part of the permanent magnet 4 due to a pressing force applied when the second metal mold 12 is engaged with the first metal mold 11.

SUMMARY OF THE INVENTION

This invention has been achieved to solve the above-mentioned problem, and it is an object of the invention to provide a rotation sensor in which the permanent magnet is prevented from chipping or breaking off. Also, it is another object of the invention to provide a mold for manufacturing the rotation sensor that can manufacture the rotation sensor in which the permanent magnet is prevented from chipping or breaking off.

To achieve the above problem, a rotation sensor according to the present invention comprises a sensor element for sensing a magnetic substance that is approaching, a permanent magnet that is provided adjacent to the sensor element for applying a magnetic field to the sensor element, and a main body portion made of a resin and mounting the sensor element, the permanent magnet and the electronic parts electrically connected to the sensor element, characterized in that the resin is swollen in a taper manner in a boundary region between the permanent magnet and the main body portion, and the resin is swollen at a corner portion of the permanent magnet.

A mold for manufacturing a rotation sensor according to this invention comprises a first metal mold having a magnet stage portion with a porous bottom for placing a permanent magnet, and a second metal mold having a space for forming a main body portion of the rotation sensor with the first metal mold, in which the permanent magnet and the main body portion are integrally molded by filling a resin into the space, characterized by comprising a taper around an opening portion of the magnet stage portion, and a magnet stage plane for laying the permanent magnet in the center on the bottom of the magnet stage portion, the magnet stage plane being formed above the bottom.

DETAILED DESCRIPTION OF THE PREFERRED EMBODIMENTS

Now, a description will be given in more detail of preferred embodiments of the invention with reference to the accompanying drawings.

Figure 1:
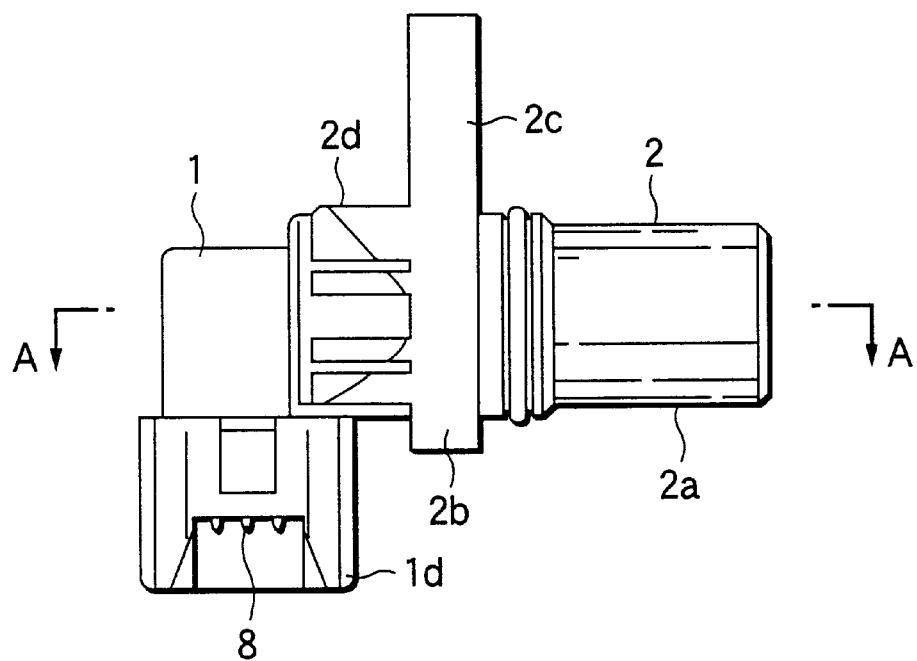
FIG. 1 is a side view showing a rotation sensor according to an embodiment of the present invention.
Figure 2:
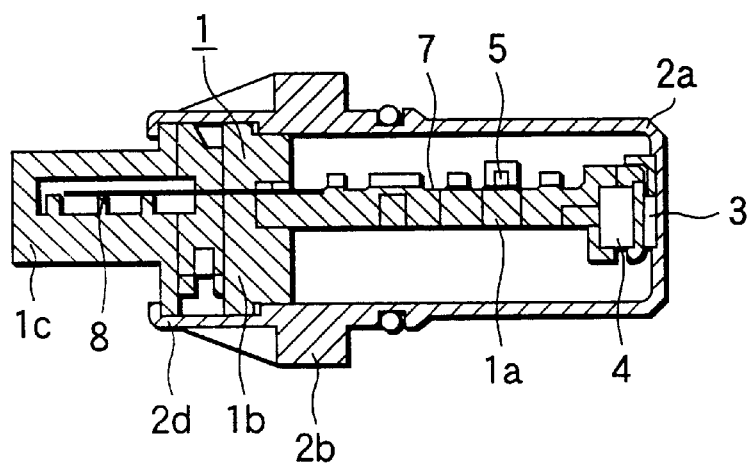
FIG. 2 is a cross-sectional view showing the rotation sensor according to the embodiment of the present invention.
Figure 3:
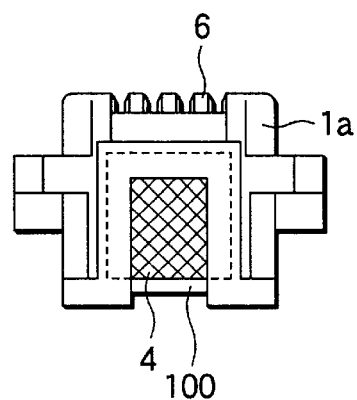
FIG. 3 is a front view showing a sensor main portion of the rotation sensor according to the embodiment of the invention.

FIG. 1 is a side view showing a rotation sensor according to an embodiment of the present invention. FIG. 2 is a cross-sectional view of the rotation sensor taken along the line A—A in FIG. 1, and FIG. 3 is a front view of a sensor main body portion. In these figures, the rotation sensor comprises the sensor main body 1 made of an insulating resin with the electronic parts mounted, and a case 2 made of insulating resin for tightly covering the sensor main body 1. Further, the sensor main body 1 comprises a main body portion 1a, a board portion 1b, an intermediate portion 1c, and a connector portion 1d. The main body portion 1a has mounted a Hall element 3 that is the core of the rotation sensor, a permanent magnet 4, and a circuit substrate 7 having mounted an electronic part 5 and formed with a circuit pattern 6.

The main body portion 1a is shaped like a substantially slender plate and has one end connected perpendicularly to a principal plane of the board portion 1b. And the circuit board 7 is mounted on the principal plane on one side. The permanent magnet 4 is mounted on the other end portion of the main body portion 1a perpendicularly to the main body portion 1a, and the Hall element 3 that is a sensor element for detecting the approaching magnetic substance is disposed on the principal plane outside the permanent magnet 4.

Also, the connector portion 1d is extended from the other end face of the intermediate portion 1c. The connector portion 1d extends from the other end face of the intermediate portion 1c perpendicularly to the main body portion 1a. A terminal 8 that is electrically connected to the circuit pattern 6 of the main body portion 1a is buried in the connector portion 1d. At a top end portion of L-character shape, a concave engagement portion connected to an external apparatus is formed, and the terminal 8 protrudes into the engagement portion.

The case 2 is composed of a cylindrical sheath portion 2a with a bottom, a flange portion 2b with an opening end portion of the sheath portion 2a thickened radially, a support portion 2c with a part of the flange portion 2b protruding radially outwardly, and a holding portion 2d protruding on the principal plane of the flange portion 2b in parallel to the sheath portion 2a.

The rotation sensor with the above constitution is attached at a predetermined position of the vehicle. With the rotation of the rotor like a gear, for example, that is the magnetic substance provided against the Hall element 3 of the rotation sensor, a concave portion and a convex portion of the rotor alternately come closer to the Hall element 3. If a magnetic field from the permanent magnet 4 to be applied to the Hall element 3 varies, the Hall element 3 detects a variation in the magnetic field as a voltage change. The voltage change produced in the Hall element 3 is converted into a pulse wave by the electronic part 5, and then this electrical signal is sent via the terminal 8 of the connector portion 1d to the external apparatus, not shown, so that the number of revolutions of the rotor is detected.

Figure 4A:
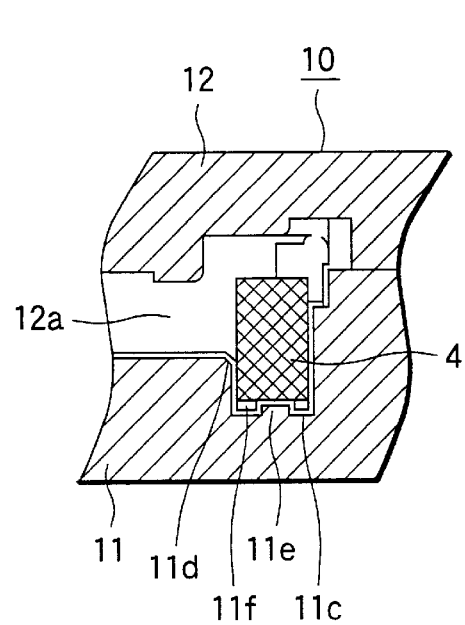
FIGS. 4A and 4B are views for explaining the molding of the rotation sensor according to the embodiment of the invention.
Figure 4B:
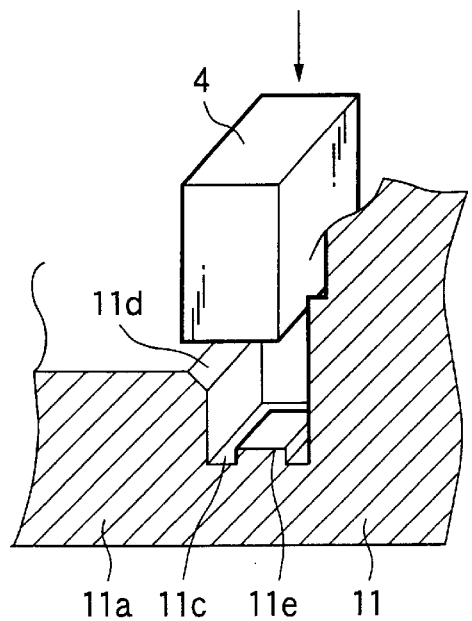
Figure 5:
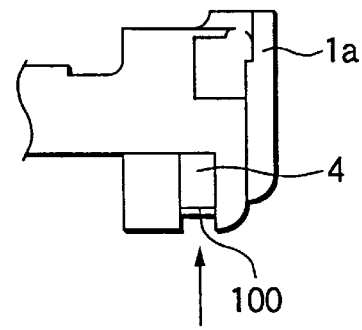
FIG. 5 is a side view showing the permanent magnet and its surroundings after molding the rotation sensor according to the embodiment of the invention.
Figure 6:
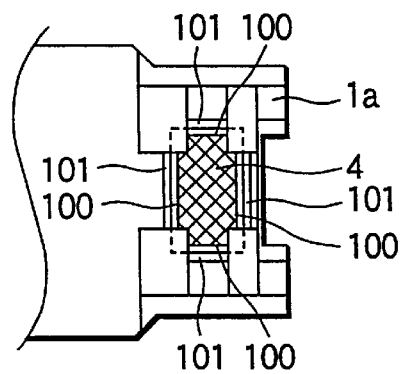
FIG. 6 is a lower face showing the permanent magnet and its surroundings after molding the rotation sensor according to the embodiment of the invention.
Figure 7:
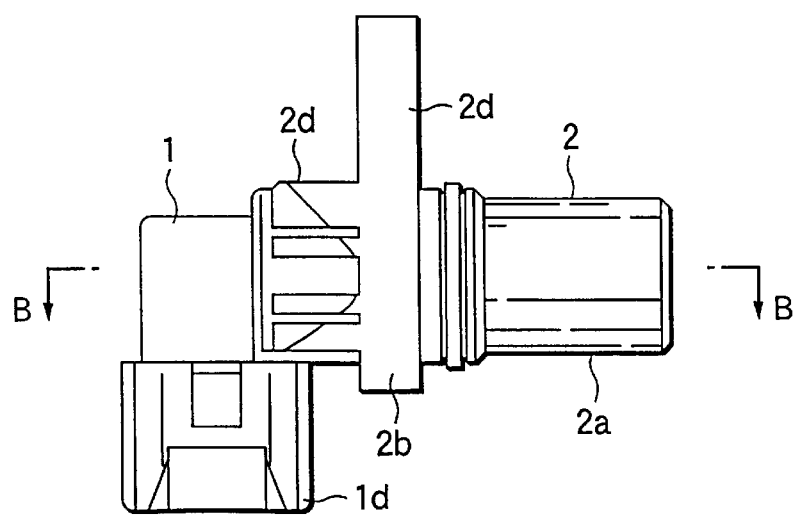
FIG. 7 is a side view showing the conventional rotation sensor.
Figure 8:
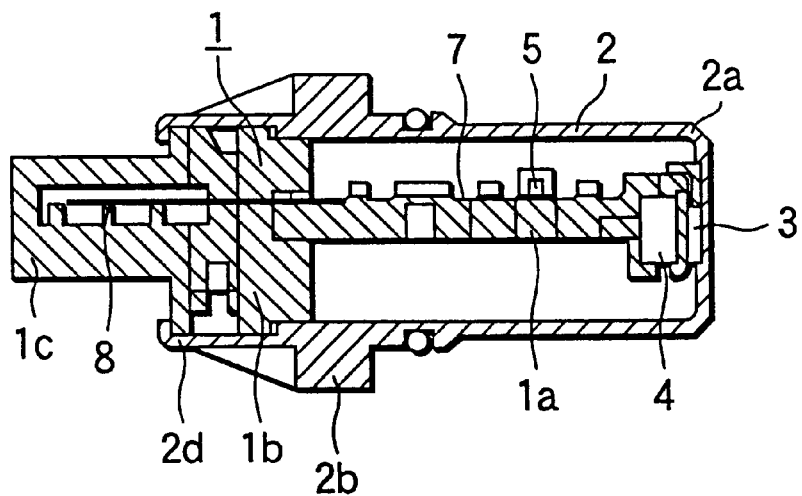
FIG. 8 is a cross-sectional view showing the conventional rotation sensor.
Figure 9:
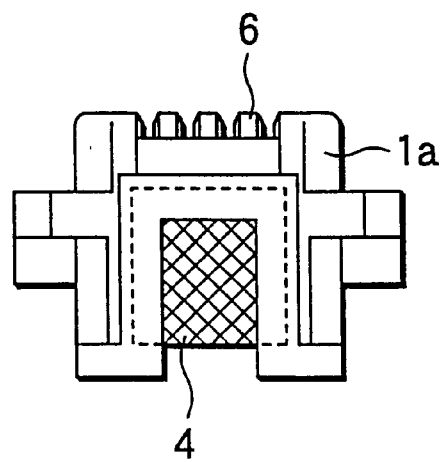
FIG. 9 is a front view showing a sensor main body portion of the conventional rotation sensor.
Figure 10A:
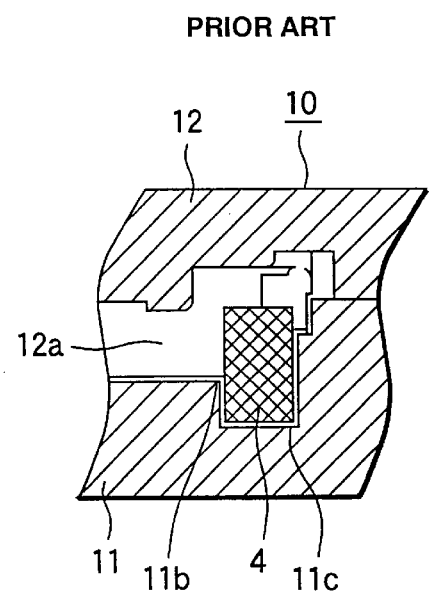
FIGS. 10A and 10B are views for explaining the molding of the conventional rotation sensor.
Figure 10B:
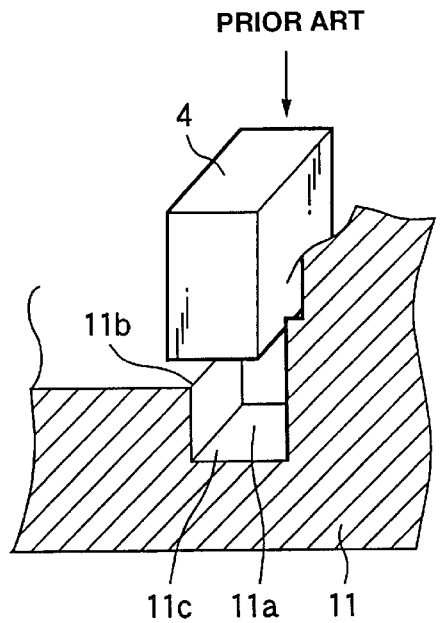
Figure 11:
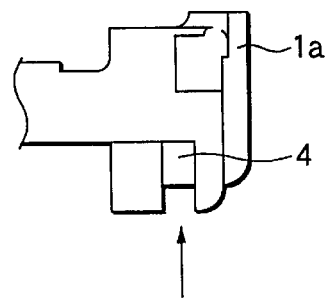
FIG. 11 is a side view showing the permanent magnet and its surroundings after molding the conventional rotation sensor.
Figure 12:
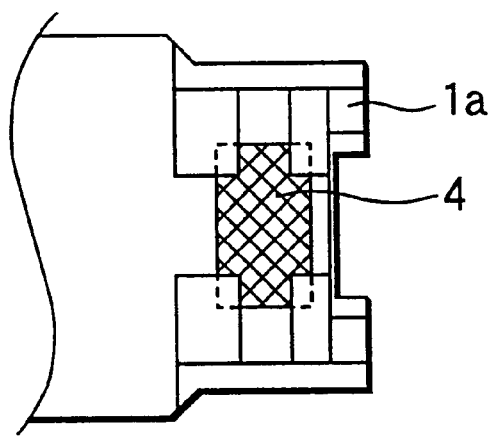
FIG. 12 is a lower view showing the permanent magnet and its surroundings after molding the conventional rotation sensor.

In a manufacturing method for the rotation sensor, first of all, the sensor main body 1 is produced by molding integrally the main body portion 1a, the board portion 1b, the intermediate portion 1c, and the connector portion 1d having the terminal 8 and the permanent magnet 3 buried. FIGS. 4A and 4B are views for explaining the molding of the rotation sensor according to the embodiment of this invention, in which FIG. 4A is a cross-sectional view, and FIG. 4B is a perspective view. FIG. 5 is a side view showing the permanent magnet after molding and its surroundings, and FIG. 6 is a lower view of the same permanent magnet as seen from a direction of the arrow in FIG. 5.

As seen from the figure, a molding apparatus 10 is composed of a first metal mold 11 and a second metal mold 12, in which the first metal mold 11 has a magnet stage portion 11a for laying the permanent magnet 4 in molding, and each of the first metal mold 11 and the second metal mold 12 has a main body molding space 12a that becomes the main body portion 1a of the rotation sensor after molding. The permanent magnet 4 is laid on the magnet stage portion 11a of the first metal mold 11, and then the second metal mold 12 is engaged with the first metal mold 11 to fill a resin into the main portion molding space 12a, whereby the permanent magnet 4 and the main portion 1a of the rotation sensor are molded together as shown in FIG. 5.

In this embodiment, the first metal mold 11 is provided with a taper 11d in the opening portion of the magnet stage portion 11a. Accordingly, when the permanent magnet 4 is inserted into the magnet stage portion 11a, the permanent magnet 4 is prevented from contacting the opening portion to chip or break off at the edge part of the permanent magnet 4.

Also, in this embodiment, the first metal mold 11 is provided with a magnet stage portion 11e having a higher surface than the bottom portion 11c in the center of the bottom portion 11c of the magnet stage portion 11a. Accordingly, the permanent magnet 4 is not laid on the bottom portion of the magnet stage portion 11a, but on the magnet stage portion 11e, whereby the permanent magnet 4 is prevented from making contact with the bottom portion 11c of the magnet stage portion 11a to chip or break off at the edge part of the permanent magnet 4.

In the rotation sensor produced in this manner, a resin flowing into a groove 11f that is formed by a difference in the height between the bottom portion 11c of the magnet stage portion 11a and the magnet stage portion 11e forms a swollen portion 100 at the edge part of the permanent magnet 4, And a resin flowing into the taper 11d of the magnet stage portion 11a forms a swollen portion 101 at a boundary part between the main body portion 1a and the permanent magnet 4.

The Hall element 3 and the circuit board 7 are mounted on the main body portion 1a. On the other hand, the case 2 is also produced as a piece by molding. And the case 2 is covered over the sensor main body 1, an upper edge part 2g of the holding portion 2d for the case 2 is caulked thermally, so that the sensor main body 1 and case 2 are fully integrated.

As above, according to the invention, the rotation sensor comprises the sensor element for sensing a magnetic substance that is approaching, the permanent magnet that is provided adjacent the sensor element for applying a magnetic field to the sensor element, and the main body portion made of a resin and mounting the sensor element, the permanent magnet and the electronic parts electrically connected to the sensor element, characterized in that the resin is swollen in a taper manner in a boundary region between the permanent magnet and the main body portion, and the resin is swollen at a corner portion of the permanent magnet, whereby there is the effect that the permanent magnet can be prevented from chipping or breaking off at the edge part of the permanent magnet.

Also, according to the invention, the mold for manufacturing the rotation sensor comprises the first metal mold having the magnet stage portion with the porous bottom for placing the permanent magnet, and the second metal mold having a space for forming the main body portion of the rotation sensor with the first metal mold, in which the permanent magnet and the main body portion are integrally molded by filling a resin into the space, characterized by comprising the taper around the opening portion of the magnet stage portion, and the magnet stage plane for laying the permanent magnet in the center on the bottom of the magnet stage portion, the magnet stage plane being formed above the bottom, whereby there is the effect that the permanent magnet can be prevented from chipping or breaking off at the edge part of the permanent magnet.

What is claimed is:

1. A rotation sensor comprising
   a sensor element for sensing a magnetic substance that is approaching, a permanent magnet that is provided adjacent said sensor element for applying a magnetic field to said sensor element; and
   a main body portion made of a resin and mounting said sensor element, said permanent magnet and the electronic parts electrically connected to said sensor element;
   wherein said main body has a first swollen portion formed in a taper manner around a boundary region between said permanent magnet and said main body portion; and
   wherein said main body portion has a second swollen portion formed at a corner portion of said permanent magnet.

2. A mold for manufacturing a rotation sensor comprising:
   a first metal mold having a magnet stage portion with a porous bottom for placing a permanent magnet; and
   a second metal mold having a space for forming a main body portion of said rotation sensor with said first metal mold;
   wherein said permanent magnet and said main body portion are integrally molded by filling a resin into said space; and
   wherein an opening portion of said magnet stage portion is tapered, and a magnet stage plane for laying said permanent magnet is formed in the center on the bottom of said magnet stage portion, said magnet stage plane being formed above the bottom.

* * * * *